(12) United States Patent
Muth

(10) Patent No.: US 6,774,918 B1
(45) Date of Patent: Aug. 10, 2004

(54) VIDEO OVERLAY PROCESSOR WITH REDUCED MEMORY AND BUS PERFORMANCE REQUIREMENTS

(75) Inventor: Peter Valentine Muth, Streamwood, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 591 days.

(21) Appl. No.: 09/605,967

(22) Filed: Jun. 28, 2000

(51) Int. Cl.[7] ................................................. G09G 5/00
(52) U.S. Cl. ........................ 345/716; 345/519; 345/764; 348/569
(58) Field of Search ................................. 345/519, 563, 345/716, 764, 629, 790, 531, 551; 348/569

(56) References Cited

U.S. PATENT DOCUMENTS

| | | | | |
|---|---|---|---|---|
| 5,345,554 A | | 9/1994 | Lippincott et al. ........... | 395/162 |
| 6,219,072 B1 | * | 4/2001 | Tanaka et al. ............... | 345/531 |
| 6,263,396 B1 | * | 7/2001 | Cottle et al. ................. | 710/263 |
| 6,292,203 B1 | * | 9/2001 | Wang .......................... | 345/682 |
| 6,310,657 B1 | * | 10/2001 | Chauvel et al. ............. | 348/569 |
| 6,400,379 B1 | * | 6/2002 | Johnson et al. .............. | 345/721 |
| 6,462,746 B1 | * | 10/2002 | Min et al. .................... | 345/545 |

FOREIGN PATENT DOCUMENTS

EP     840277 A2     5/1998     ............ G09G/5/14

OTHER PUBLICATIONS

Patent Abstracts of Japan vol. 1995, No. 11, Dec. 26, 1995 & JP 07 219510 A (Sanyo Electric Co Ltd.), Aug. 18, 1995 abstract.

* cited by examiner

Primary Examiner—Matthew C. Bella
Assistant Examiner—Mackly Monestime
(74) Attorney, Agent, or Firm—Michael J. Ure

(57) ABSTRACT

A method of video overlay processing and a system thereof. On-screen display (OSD) data for generating an image on a display device are downloaded to an OSD unit on an integrated circuit. The OSD data are downloaded in bursts separated by gaps. During the gaps, overlay data for generating an overlay on the image are downloaded to an overlay unit on the integrated circuit. The overlay data are divided into portions so that the overlay data can be downloaded in the time between bursts of OSD data. Generally, the amount of overlay data downloaded during a gap is sufficient for generating enough of the overlay until the next gap occurs and the next portion of overlay data is downloaded. Consequently, the size of the memory residing on the integrated circuit for storing overlay data can be reduced to the size needed to store only a portion of the overlay. Furthermore, the bus bandwidth for the OSD is more efficiently utilized.

26 Claims, 5 Drawing Sheets

VIDEO OVERLAY PROCESSOR WITH REDUCED MEMORY AND BUS PERFORMANCE REQUIREMENTS

RELATED U.S. APPLICATION

This application claims priority to the copending provisional patent application with Serial No. 60/141,916, entitled "Video Overlay Processor with Reduced RAM Size and Bus Performance Requirements," with Filing Date Jun. 30, 1999, and assigned to the assignee of the present application.

TECHNICAL FIELD

The present invention relates to the field of video processing. More specifically, the present invention pertains to a method and system for processing a video overlay for an on-screen display.

BACKGROUND ART

Prior Art FIG. 1 illustrates one embodiment of an on-screen display 15 for a rasterized video screen 10 used by devices such as consumer electronic devices (e.g., television sets) or computer monitors. In a television set, for example, the on-screen display typically includes information such as the channel being viewed, the date and/or time, a main menu for accessing a plurality of audio and video options, and a representation (e.g., a sliding bar) showing the level of volume, color, etc. A viewer can make selections using either the buttons on a remote device or the buttons on the front of the television set.

Prior art methods for introducing an overlay, such as a cursor, onto on-screen display 15 are complex. In actuality, on-screen display 15 is typically made up of multiple and separate sections, each of which is rendered and controlled using different pieces of software. For example, the channel number and date/time may be associated with one section (20) and piece of software, the main menu with another section (30) and piece of software, and the sliding bar with still another section (40) and piece of software. A cursor, when available, is problematic because it needs to be able to travel across the entire on-screen display 15. Thus, when the cursor moves from one section of on-screen display 15 to another (e.g., from section 30 to section 40), it is necessary to indicate to the corresponding pieces of software when the cursor is leaving one section and entering the next. The programming associated with providing and executing this capability is difficult and prone to error.

Alternatively, the overlay can be generated by taking the software for each section 20, 30 and 40, generating a bit map of the on-screen display in memory, and then "painting" the overlay onto the bit map. That is, at the position in the bit map where the overlay is to be located, the data for the on-screen display are removed and the data for the overlay are inserted in their place. The bit map including the overlay is then downloaded from memory and displayed on-screen.

However, this approach is also problematic because, in order to be effectively implemented, a large memory is needed to generate and store the bit map before it is displayed. This approach may be used by a device with enough available resources, such as a computer system, but consumer electronic devices such as television sets are much more limited with regard to available memory, and thus cannot acceptably implement this approach. For example, while a computer system may have 256 megabytes (MB) of random access memory (RAM), a consumer electronic device may have on the order of only one MB of RAM. Similar problems occur in prior art devices with limited bus bandwidth to memory, or with limited on-chip memory.

Consequently, on-screen displays used in prior art consumer electronic devices generally do not use overlays such as cursors. Instead, the viewer has to scroll through menus and the like in order to select options and indicate preferences. In comparison to the relative ease in which selections can be made using a cursor on a computer monitor, having to scroll through menus on a television set, for example, can be tedious and inconvenient.

Accordingly, what is needed is a method and/or system that can provide an overlay (such as a cursor) in an on-screen display in a consumer electronic device. What is also needed is a method and/or system that can accomplish the above need and that can be implemented with limited system resources, in particular in devices with limited memory, limited bus bandwidth to memory, and/or limited on-chip memory. The present invention provides a novel solution to the above needs.

DISCLOSURE OF THE INVENTION

The present invention provides a method and system that can provide an overlay such as a cursor in an on-screen display in a consumer electronic device. The present invention also provides a method and system that can be implemented with limited system resources, in particular in devices with limited bus bandwidth to memory and/or limited on-chip memory.

The present embodiment of the present invention pertains to a method of video overlay processing and a system thereof. On-screen display (OSD) data for generating an image on a display device are downloaded to an OSD unit on an integrated circuit. The OSD data are downloaded in bursts separated by gaps. During the gaps, overlay data for generating an overlay on the image are downloaded to an overlay unit on the integrated circuit.

The overlay data are divided into portions so that the overlay data can be downloaded during the time between bursts of OSD data. Generally, the amount of overlay data downloaded during a burst gap is sufficient for generating enough of the overlay until the next burst gap occurs and the next portion of overlay data is downloaded. In one embodiment, the amount of overlay data downloaded corresponds to one line of the overlay. In another embodiment, the amount of data downloaded corresponds to the amount of the overlay that can be displayed before the next burst gap in OSD data.

In the present embodiment of the present invention, the video overlay process is implemented by a video processor (e.g., an integrated circuit) comprising an OSD unit and an overlay unit. In this embodiment, the OSD data and the overlay data are downloaded from external (e.g., off-chip) memory buffers to on-chip memories in the OSD unit and the overlay unit, respectively. Because only a portion of the overlay data is downloaded during each burst gap, the amount of memory needed to store the overlay data can be reduced.

In one embodiment, a controller element can be used to regulate the burst gaps, for example in order to guarantee that the burst gap is long enough to download the overlay data most efficiently.

In summary, the method and system for video overlay processing described in accordance with the present invention eliminates the requirement that on-chip memory be large enough to hold the data needed for an entire overlay.

Instead, only one line or a part of one line of the overlay needs to be stored on-chip. Also, in accordance with the present invention, it is not necessary to preempt the OSD unit in order to download overlay data.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
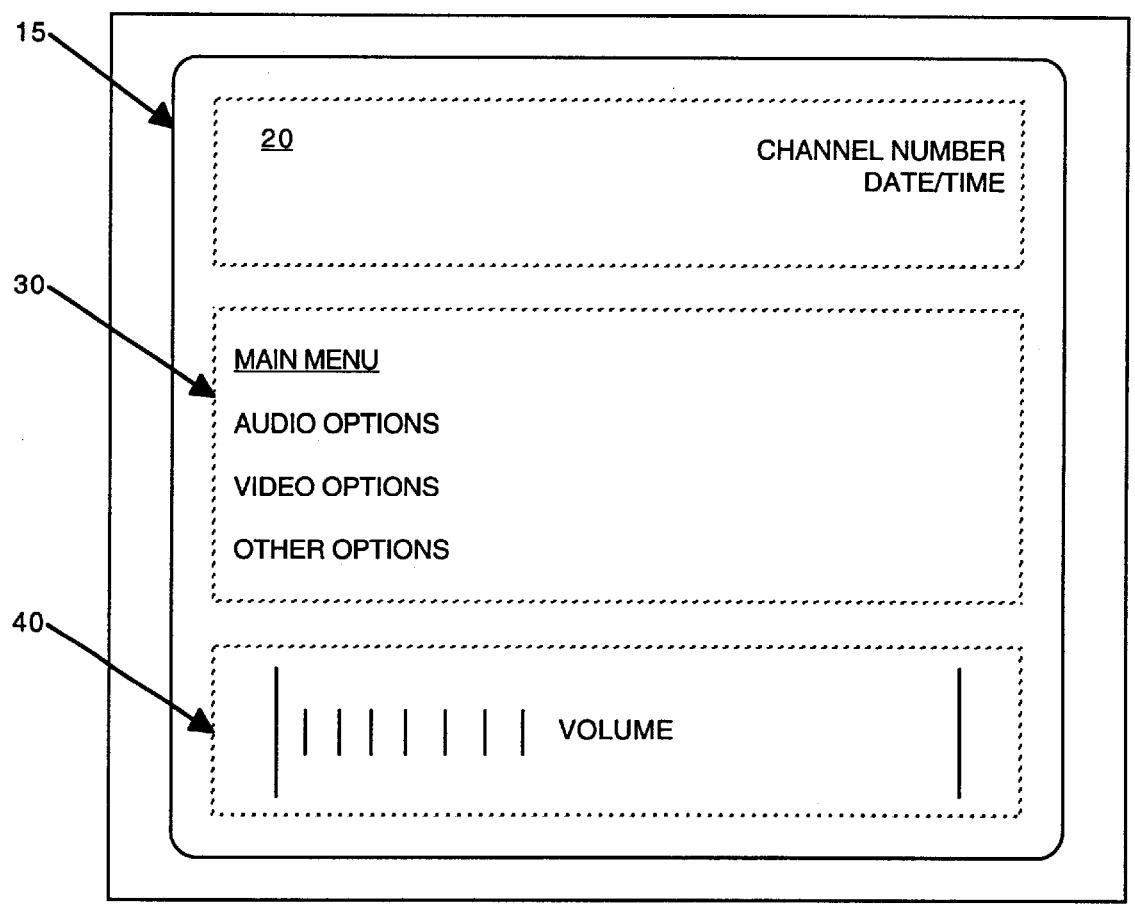
FIG. 1 illustrates an example of a prior art on-screen display.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system or similar electronic computing device (e.g., an intelligent consumer electronic device having a processor). It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "downloading," "controlling," "sending," "interrupting," "generating," or the like, refer to actions and processes (e.g., process 500 of FIG. 5) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

The present invention is discussed in the context of a consumer electronic device such as a television set. However, it is appreciated that the present invention may be utilized with various other types of devices that use a rasterized video screen. Furthermore, the present invention is discussed in the context of a small overlay such as a cursor; however, it will be apparent that the present invention may be extended to larger overlays as well.

Figure 2:
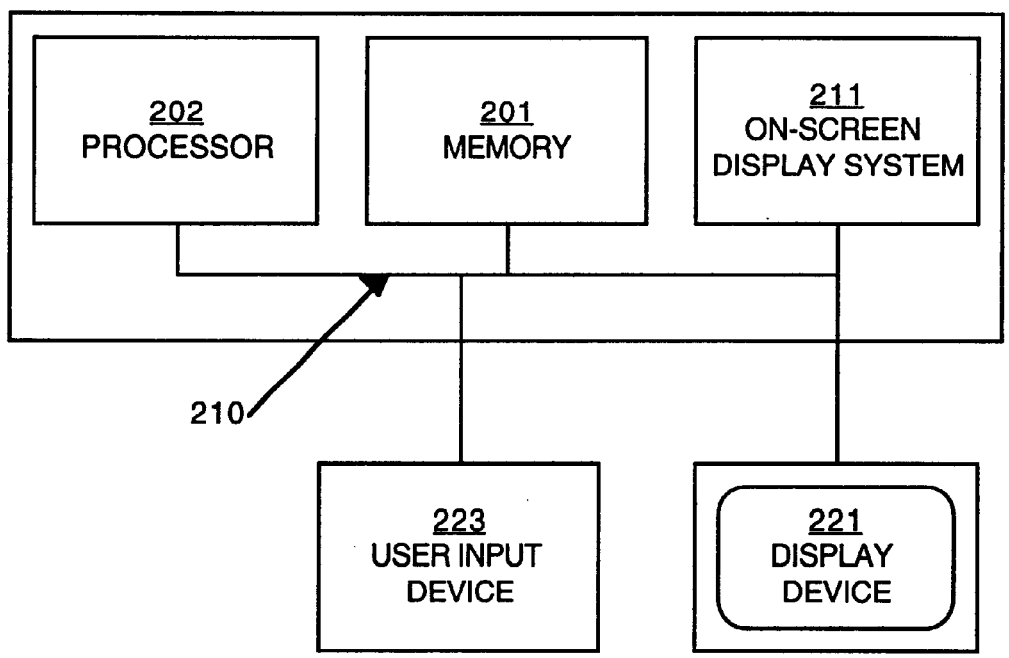
FIG. 2 is a block diagram of one embodiment of a consumer electronic device upon which embodiments of the present invention may be practiced.

FIG. 2 is a block diagram of one embodiment of a consumer electronic device 200 (e.g., a television set) upon which embodiments of the present invention may be practiced. Device 200 comprises a bus 210 for communicating data, and a processor 202 coupled with bus 210 for processing information. Device 200 further comprises a random access memory (RAM) or other read/write storage device (memory 201) coupled to bus 210 for storing data and instructions.

Device 200 is coupled to display device 221, which may be a liquid crystal device, cathode ray tube, or other display device suitable for creating graphic images, on-screen displays, overlays, and alphanumeric characters recognizable to the user. Device 200 can also be coupled via bus 210 to a type of user input device 223 (e.g., a mouse or like device such as a trackball or cursor direction keys) which is used for controlling cursor movement on display device 221.

In the present embodiment, also coupled to bus 210 is on-screen display system 211. On-screen display (OSD) system 211 is a video processor or video processing system for providing an on-screen display on display device 221. In accordance with the present invention, OSD system 211 is also used for processing a video overlay (e.g., a cursor) on the on-screen display.

Figure 3:
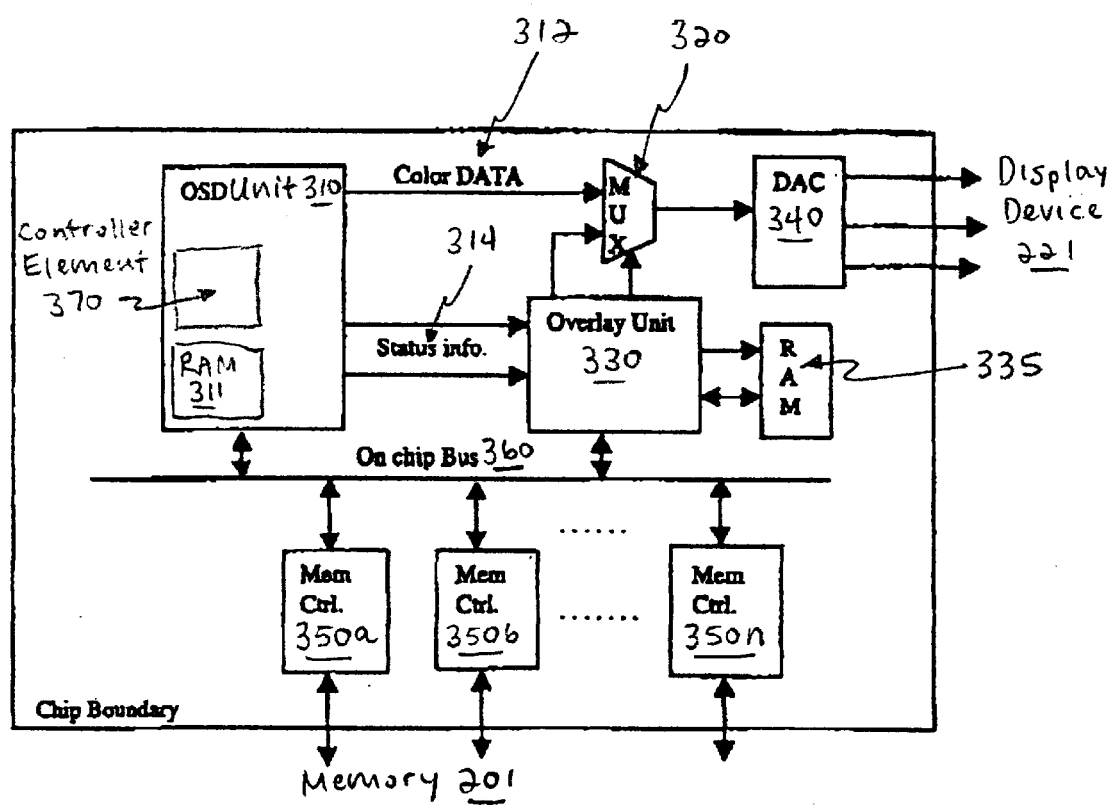
FIG. 3 is a block diagram of one embodiment of a on-screen display system upon which embodiments of the present invention may be practiced.

FIG. 3 is a block diagram of one embodiment of an on-screen display system 211 upon which embodiments of the present invention may be practiced. In the present embodiment, OSD system 211 comprises two processors—OSD unit 310 and overlay unit 330—that coexist on a single integrated circuit ("chip"). However, it is appreciated that other configurations in hardware may be used in accordance with the present invention.

In the present embodiment, OSD system 211 is coupled to memory 201 via one or more memory controllers 350a, 350b, . . . , 350n. Memory controllers 350a, 350b, . . . , 350n are coupled to OSD unit 310 and overlay unit 330 via on-chip bus 360. OSD unit 310 and overlay unit 330 in turn are coupled to display device 221 via multiplexer (MUX) 320 and digital-to-analog converter (DAC) 340. In the present embodiment, OSD unit 310 incorporates RAM 311 and overlay unit 330 is coupled with RAM 335; however, it is appreciated that different configurations may be used in accordance with the present invention (that is, for example, RAM 311 may be external to OSD unit 310 and/or RAM 335 may be incorporated into overlay unit 330).

In the present embodiment, OSD unit 310 downloads on-screen display data from memory 201 and stores the data in memory (e.g., RAM 311). In one embodiment, the on-screen display data is used for displaying on display device 221 information such as the channel being viewed, the date and/or time, a main menu for accessing a plurality of audio and video options, and a representation (e.g., a sliding bar) showing the level of volume, color, etc.

In the present embodiment, due to the limitation in size of RAM 311, OSD information is downloaded to OSD unit 310 from memory 201 in segments or "bursts." OSD data are downloaded until RAM 311 is full or until an upper threshold capacity is reached, and then the download is halted for a period of time or for a number of processor cycles. The downloaded OSD data (e.g., color data 312) are used to generate a corresponding portion of the on-screen display, thereby emptying RAM 311. Once RAM 311 is empty, or when a lower threshold capacity is reached, the download of OSD data from memory 201 is restarted. Thus, between bursts of OSD data, there is a period of time (a "gap" or "burst gap") in which on-chip bus 360 is not being used to download OSD data.

In accordance with the present invention, during these gaps, overlay data are downloaded from memory 201 to overlay unit 330 and stored in memory (e.g., RAM 335). In one embodiment of the present invention, the overlay is divided into a series of one-overlay-bitmap-line pieces, so that all or part of an overlay bitmap line can be downloaded during the time between bursts of OSD data. The downloaded overlay data are used to generate a corresponding portion of the overlay, thereby emptying RAM 335. During a subsequent burst gap, the next portion of the overlay data are downloaded from memory 201. Additional information is provided in conjunction with FIG. 4A.

Continuing with reference to FIG. 3, because only a portion of the overlay is downloaded during each burst gap, the size requirements for RAM 335 can be substantially reduced. RAM 335 can be sized to hold the smaller of one line of the overlay or the amount of the overlay that can be displayed before the next OSD burst gap. The size of RAM 335 can depend on system parameters such as cost, complexity of control logic, the number, size, frequency and spacing of burst gaps, the size of the overlay line, etc. In addition, by using the burst gaps to download overlay data, the available bandwidth of on-chip bus 360 is more efficiently utilized.

In one embodiment, OSD system 211 includes a controller element 370 that is used to regulate the burst gaps. In one embodiment, controller element 370 is implemented as a hardware component residing in OSD unit 310; however, it is appreciated that in other embodiments controller element 370 may also be implemented using various other methods and structures including but not limited to microcode, state machines, software or firmware. Furthermore, it is appreciated that controller element 370 can reside within overlay unit 330 or as a separate component within OSD system 211.

Controller element 370 is for guaranteeing a prescribed number of cycles or a certain period of time between bursts during which overlay unit 330 can download overlay data. In one embodiment, controller element 370 is a timer mechanism that is used to control the length of the burst gaps. In other embodiments, controller element 370 can instead count the number of pixels, pixel clocks, CPU clocks, bus clocks, etc. Controller element 370 is advantageous because it can be adjusted in order to accommodate different sizes of overlays; for example, it can be used to lengthen burst gaps to allow for overlays larger than a cursor.

It is appreciated that other mechanisms can be used to provide a guaranteed period of time for overlay unit 330 to download overlay data. For example, a set of instructions can be used to prescribe circumstances wherein OSD unit 310 is required to yield control of on-chip bus 360 to overlay unit 330, or to prescribe a set of conditions wherein OSD unit 310 is not allowed to gain access to on-chip bus 360 (so-called "keep out regions"). Other mechanisms (e.g., control logic) for managing the transition from downloading OSD data to downloading overlay data, and vice versa, are described below in conjunction with FIG. 5.

In the present embodiment, multiplexer 320 forwards either OSD data or overlay data to display device 221, depending on whether on-screen display information or an overlay is to be displayed. Overlay unit 330 receives programmed instructions from, for example, processor 202 (FIG. 2) that indicate the imaging point on display device 221 where an overlay is to be located. OSD unit 310 uses status information 314 to communicate to overlay unit 330 the current imaging point in the on-screen display. Based on the instructions from processor 202 and the status information 314, overlay unit 330 determines when overlay data are to be inserted in place of OSD data. When overlay data are to be inserted, overlay unit 330 controls multiplexer 320 to send overlay data to display device 221 in lieu of OSD data. In this manner, OSD system 211 "paints" an overlay on-screen at the proper imaging point.

It is appreciated that the overlay may contain translucent areas, through which the underlying on-screen display may be seen. In this case, overlay unit 330 would not insert overlay data in lieu of the OSD data. That is, based on the information within the overlay data, overlay unit 330 can determine on a pixel-by-pixel basis when to interrupt the sending of OSD data to display device 221 in order to insert overlay data. For example, if this information shows the overlay unit is not translucent, then the sending of the OSD data would be interrupted, and vice versa.

Figure 4A:
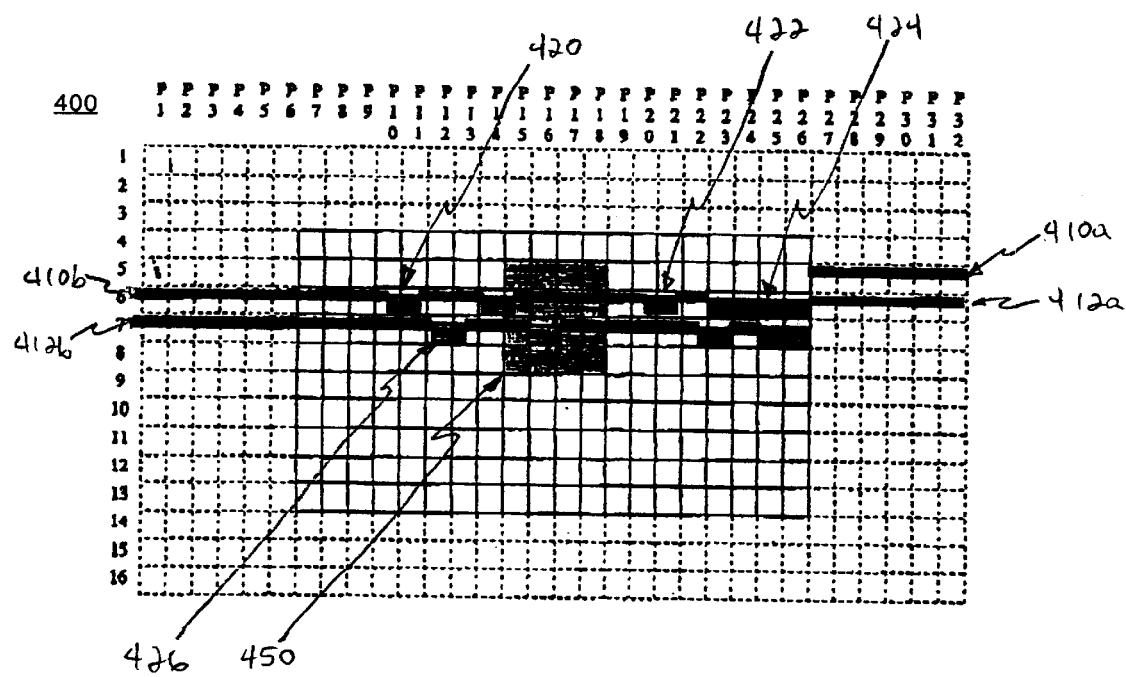
FIG. 4A is a diagram exemplifying a video screen being scanned in accordance with one embodiment of the present invention.

FIG. 4A is a diagram exemplifying a video screen 400 being scanned onto a display device (e.g., display device 221 of FIG. 2) in accordance with one embodiment of the present invention. Typically, a video screen 400 is scanned starting at the top left screen pixel on the first scan line, then proceeding from left to right on each scan line, ending at the bottom right screen pixel. Video screen 400 is generated many times per second.

In the present embodiment, the scan lines are numbered 1–16 from top to bottom, and the screen pixels are designated p1–p32 from left to right. The visible portion of video screen 400 is from pixels p7–p26 on each of lines 4–13. An overlay 450 is located at pixels p15–p18 on each of scan lines 5–8. It is appreciated that these screen and overlay dimensions are used to simplify the description, and that any screen size may be utilized in accordance with the present invention.

With reference to FIG. 3 and FIG. 4A, the heavy horizontal lines (exemplified by lines 410a–b and 412a–b) indicate the times when on-chip bus 360 is being used to download OSD data from memory 201 to OSD unit 310, specifically to RAM 311. That is, lines 410a–b and 412a–b exemplify the times at which on-chip bus 360 is essentially saturated with OSD data. The shaded areas (exemplified by 420, 422, 424 and 426) represent burst gaps between bursts of OSD data; that is, gaps 420, 422, 424 and 426 represent times in which on-chip bus 360 is not saturated with OSD data. In accordance with the present invention, gaps 420, 422, 424 and 426 (and other such gaps not specifically labeled) can be used to download overlay data from memory 201 to overlay unit 330 (specifically, to RAM 335). In this manner, downloading of OSD data and overlay data to RAM 311 and RAM 335, respectively, can alternate as necessary in order to maintain a required amount of data in each memory.

Any or all of the burst gaps can be used depending on factors such as the amount of overlay data, the length of the burst gap, latencies associated with the buses (including bus 210 of FIG. 2 and on-chip bus 360) and with the memories (including memory 201, RAM 311 and RAM 335), and setup and access latencies. Burst gaps may or may not be used depending also on the memory performance versus the pixel display rate, and the complexity of the control logic needed to achieve satisfactory system performance.

Figure 4B:
FIG. 4B is an illustration of an overlay bitmap in accordance with one embodiment of the present invention.

FIG. 4B illustrates a bitmap of overlay 450 in accordance with one embodiment of the present invention. The lines of overlay 450 are labeled A-D from top to bottom. In this embodiment, overlay 450 is illustrated as a pointer-type cursor. In accordance with the present invention, different sizes and shapes of overlays can be used.

With reference to FIGS. 4A and 4B, in the present embodiment, overlay 450 begins displaying on line 5 at pixel p15. At line 5, pixel p27, the on-screen display unit 310 begins setting up for line 6, and saturates on-chip bus 360 (FIG. 3) with OSD data (lines 410a–b) until line 6, pixel p10, begins to display. At this point, there is a burst gap 420 during which overlay unit 330 downloads line B of overlay 450 to RAM 335 (FIG. 3). Line B of overlay 450 is displayed at line 6, pixels p15–p18, emptying RAM 335. Accordingly, the overlay data for line C of overlay 450 can be downloaded during burst gaps 422, 424 and/or 426. Line C of overlay 450 is displayed at line 7, pixels p15–p18. This process is continued for each line of overlay 450 until the overlay is complete.

In the illustration of FIG. 4A, the visible portion of video screen 400 is being used for downloading overlay data (that is, burst gaps are shown as occurring during those periods in which the on-screen display is being generated and displayed). It is appreciated that the regions of video screen 400 that are not visible can be used by OSD unit 310 and overlay unit 330 to load RAM 311 and RAM 335 in preparation for the visible portion of video screen 400.

Figure 5:
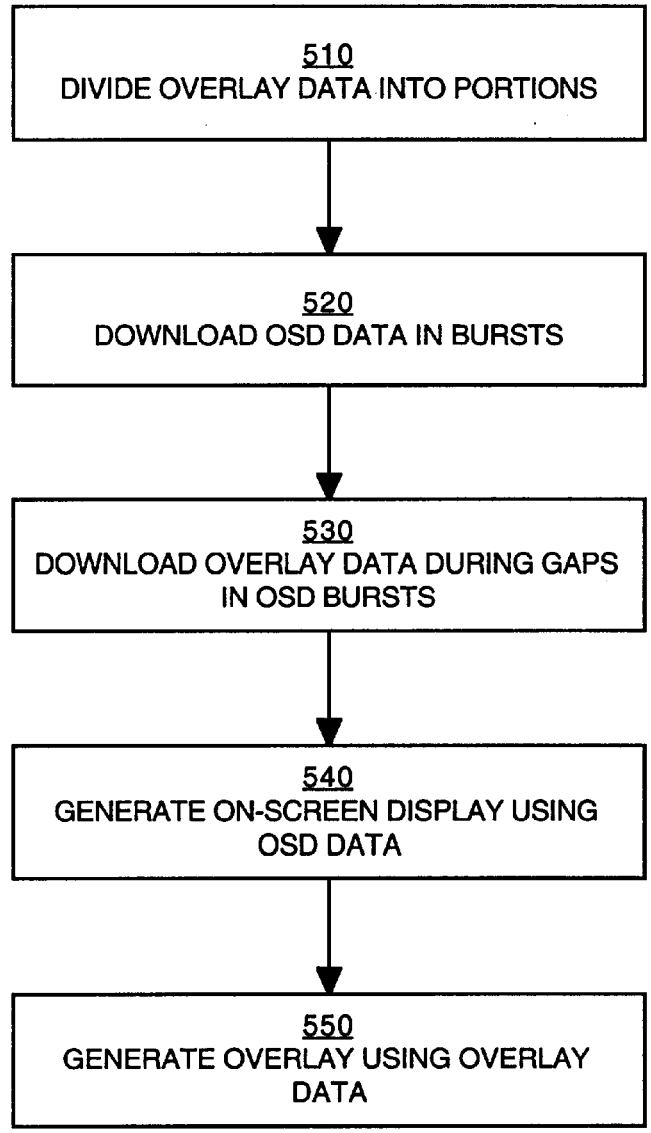
FIG. 5 is a flowchart of the steps in a video overlay process in accordance with one embodiment of the present invention.

FIG. 5 is a flowchart of the steps in a video overlay process 500 in accordance with one embodiment of the present invention. In one embodiment, process 500 can be implemented as computer-readable program instructions stored and executed by OSD system 211 (FIG. 3). Alternatively, with reference also to FIG. 2, process 500 can be implemented by a consumer electronic device (e.g., device 200) as computer-readable program instructions stored in a memory unit (e.g., memory 201) and executed by a processor (e.g., processor 202) in cooperation with OSD system 211.

It is appreciated that, although process 500 is illustrated as a series of steps, steps can be performed concurrently (in parallel). For example, while overlay data are being downloaded during a burst gap, OSD data can be sent to display device 221 (FIG. 3) to generate an on-screen display.

In step 510 of FIG. 5, the overlay data are divided into portions; for example, the overlay can be divided into a series of one-overlay-bitmap-line pieces. Alternatively, the overlay data can be divided into portions small enough to be downloaded during a single burst gap, depending on the length of the gap. Similarly, the overlay data can be divided into portions corresponding to an amount of the overlay which can be displayed before a subsequent burst gap occurs.

In step 520 of FIG. 5, with reference also to FIG. 3, the OSD data are downloaded in bursts from off-chip (e.g., memory 201). In the present embodiment, OSD data are downloaded onto on-chip RAM 311 until either RAM 311 is filled, or until an upper threshold on capacity is reached. When OSD data are not being downloaded, overlay data can be downloaded in the gaps between OSD bursts (step 530).

In various embodiments, different mechanisms (e.g., control logic) can be used to manage the transition from downloading OSD data to downloading overlay data, and vice versa. Detection of burst gaps can be done by OSD unit 310 or by overlay unit 330. In one embodiment, once OSD unit 310 determines that the download of OSD data should stop, it can send an indication to processor 202 (FIG. 2) to stop downloading OSD data from memory 201. In another embodiment, OSD unit 310 is performing the download of OSD data, and once OSD unit 310 determines that the download should stop, OSD unit 310 stops the download and indicates this to processor 202. Concurrently, the indication from OSD unit 310 can be used to notify overlay unit 330 that OSD data are not being downloaded and that on-chip bus 360 is not saturated with OSD data, so that overlay data can be downloaded. Alternatively, overlay unit 330 can monitor the downloading of OSD data in order to detect a gap in the flow of OSD data. In that case, overlay data can be held at the ready, and when a gap in the OSD data is detected, the overlay data can be inserted into the gap and downloaded.

Depending on the architecture used for managing on-chip bus 360, it may not be necessary to detect burst gaps, nor may it be necessary for OSD unit 310 and overlay unit 330 to communicate with regard to the occurrence or detection of burst gaps. Instead, in one embodiment, overlay unit 330 can be defined as a lower priority device relative to OSD unit 310, and as such overlay unit 330 will always be preempted by OSD unit 310 should OSD unit 310 be ready to download OSD data. For example, overlay unit 330 may be in control of on-chip bus 360 and downloading overlay data, while OSD unit 310 is emptying RAM 311 by generating an on-screen display. Once RAM 311 reaches a lower threshold on capacity, OSD unit 310 automatically regains control of on-chip bus 360 from overlay unit 330.

Similarly, overlay unit 330 can be defined as the default device having control of on-chip bus 360 when the bus is not controlled by OSD unit 310. In this case, when OSD unit 310 stops downloading OSD data and relinquishes control of the bus, overlay unit 330 automatically gains control of the bus and begins to download overlay data.

The control logic for managing the transition between downloading OSD data and downloading can be made more or less complicated depending on considerations such as system performance, memory architecture, burst length, and the size of the downloads (for OSD data and for overlay data). Download times and latencies involved with the interaction of on-chip and off-chip memories are also considered, in order to avoid starving either RAM 311 or RAM 335 of data or to avoid unnecessarily preempting the download of one set of data for another. For example, OSD unit 310 and overlay unit 330 may be accessing single cycle memory (e.g., no latency) using separate memory controllers. As such, the transition between downloading OSD data and downloading overlay data occurs essentially without delay, and a simple control scheme in which OSD unit 310 always preempts overlay unit 330 may be acceptable.

On the other hand, if there is a relatively significant latency associated with the transition, then performance can be improved by increasing the complexity of the control logic, for example by guaranteeing that burst gaps are of a prescribed duration long enough to allow overlay data to be efficiently downloaded. In one embodiment, this is accomplished using a timer mechanism that enforces a minimum length for the burst gap (measured in time or in processor cycles). However, as explained in conjunction with FIG. 3, other mechanisms and methods can be used to regulate the burst gaps.

With reference again to FIGS. 3 and 5, in step 540, the overlay data are used to generate an on-screen display on display device 221. In step 550, the overlay data are used to generate an overlay on the on-screen display. To generate the on-screen display, OSD unit 310 sends OSD data (e.g., color data 312) to display device 221 via multiplexer 320. OSD unit 310 sends status information 314 to overlay unit 330 identifying the imaging point associated with each pixel of color data 312. Overlay unit 330 receives instructions from processor 202 (FIG. 2) identifying the imaging point at which an overlay is to be located. When the status information 314 indicates that the imaging point for an overlay has been reached, then overlay unit 330 directs multiplexer 320 to insert overlay data in lieu of the OSD data.

In summary, the present invention allows an overlay to be generated for an on-screen display, by inserting overlay data in place of OSD data in the OSD system. The overlay (e.g., a cursor) can be used in any portion of the displayed video screen; in particular, the overlay can travel from one region of the video screen to another, even when those regions may be controlled by different pieces of software.

In addition, the present invention reduces the size requirements for the on-chip memory for storing overlay data (e.g., RAM 335 of FIG. 3), and so the present invention can be implemented in devices with limited memory resources. The overlay can be divided into separate portions, and RAM 335 can be sized to hold the smaller of either one line of the overlay or the amount of the overlay that can be displayed before the next OSD burst gap. The reduced size of RAM 335 in turn can reduce associated hardware costs.

Furthermore, the overlay data are downloaded to the on-chip memory in the gaps occurring between bursts of OSD data, thereby more efficiently utilizing the available bandwidth of the on-chip bus. Thus, in accordance with the present invention, overlay data can be downloaded without preempting the download of OSD data. Control mechanisms can be implemented to avoid conflicts for control of the on-chip bus without affecting OSD, overlay processor, or system performance. Accordingly, there is little or no impact on the performance requirements of the on-chip bus when the OSD unit and the overlay unit coexist on the same chip.

Thus, the present invention provides a method and system that can provide an overlay such as a cursor for an on-screen display in a consumer electronic device. The present invention also provides a method and system that can be implemented with limited system resources, in particular with limited memory, limited bus bandwidth to memory, and/or limited on-chip memory.

The preferred embodiment of the present invention, video overlay processor with reduced memory and bus performance requirements, is thus described. While the present invention has been described in particular embodiments, it should be appreciated that the present invention should not be construed as limited by such embodiments, but rather construed according to the following claims.

What is claimed is:

1. A method of video overlay processing, said method comprising the computer-implemented steps of:

a) downloading on-screen display (OSD) data for generating an image on a display device, said downloading occurring in segments separated by gaps; and b) during a gap in said downloading of said OSD data, downloading an amount of overlay data for generating an overlay on said image, wherein said amount of overlay data comprises a portion of said overlay.

2. The method of video overlay processing as recited in claim 1 further comprising the steps of:

downloading said amount of overlay data to a memory unit, wherein said memory unit and said amount of overlay data downloaded during said gap in said OSD data are approximately equal in size.

3. The method of video overlay processing as recited in claim 2 wherein said amount of overlay data is for generating a line of said overlay.

4. The method of video overlay processing as recited in claim 2 wherein said amount of overlay data comprises said portion of said overlay generated before a next gap in said OSD data.

5. The method of video overlay processing as recited in claim 1 further comprising the step of:

controlling the length of said gaps in said OSD data.

6. The method of video overlay processing as recited in claim 1 further comprising the step of:

controlling said amount of overlay data.

7. The method of video overlay processing as recited in claim 1 further comprising the steps of:

c) sending said OSD data to said display device;

d) interrupting said sending of said OSD data; and e) sending overlay data to said display device in lieu of said OSD data.

8. The method of video overlay processing as recited in claim 7 wherein said interrupting of said step d) is responsive to a signal sent from an OSD unit to an overlay unit.

9. The method of video overlay processing as recited in claim 7 wherein said interrupting of said step d) is responsive to information within said overlay data.

10. An integrated circuit coupled to a display device, said integrated circuit comprising:

an on-chip bus;

an on-screen display (OSD) unit coupled to said on-chip bus; and an overlay unit coupled to said on-chip bus;

said integrated circuit for performing a method of video overlay processing comprising the computer-implemented steps of:

a) downloading to said OSD unit OSD data for generating an image on said display device, said downloading occurring in segments separated by gaps; and b) during a gap in said downloading of said OSD data, downloading to said overlay unit an amount of overlay data for generating an overlay on said image, wherein said amount of overlay data comprises a portion of said overlay.

11. The integrated circuit of claim 10 wherein said OSD data and said overlay data are downloaded from memory buffers external to said integrated circuit.

12. The integrated circuit of claim 10 wherein said OSD unit is coupled with a first memory unit and wherein said overlay unit is coupled with a second memory unit.

13. The integrated circuit of claim 12 wherein said second memory unit and an amount of overlay data downloaded in a gap in said OSD data are approximately equal in size.

14. The integrated circuit of claim 13 wherein said amount of overlay data is sufficient for generating one line of said overlay.

15. The integrated circuit of claim 13 wherein said amount of overlay data comprises said portion of said overlay generated before a next gap in said OSD data.

16. The integrated circuit of claim 10 further comprising:

a controller element for regulating said gaps in said OSD data.

17. The integrated circuit of claim 10 further comprising:

a multiplexer coupled to said OSD unit and to said overlay unit, wherein said multiplexer is adapted to send OSD data to said display device and to send overlay data to said display device in lieu of said OSD data.

18. A computer-usable medium having computer-readable program code embodied therein for causing a video processor to perform the steps of:

a) downloading on-screen display (OSD) data for generating an image on a display device, said downloading occurring in segments separated by gaps; and b) during a gap in said downloading of said OSD data, downloading an amount of overlay data for generating an overlay on said image, wherein said amount of overlay data comprises a portion of said overlay.

19. The computer-usable medium of claim 18 wherein said computer-readable program code embodied therein causes a video processor to perform the step of:

downloading said amount of overlay data to a memory unit, wherein said memory unit and said amount of overlay data downloaded during said gap in said OSD data are approximately equal in size.

20. The computer-usable medium of claim 18 wherein said amount of overlay data is sufficient for generating a line of said overlay.

21. The computer-usable medium of claim 18 wherein said amount of overlay data comprises said portion of said overlay generated before a next gap in said OSD data.

22. The computer-usable medium of claim 18 wherein said computer-readable program code embodied therein causes a video processor to perform the step of:

controlling the length of said gaps in said OSD data.

23. The computer-usable medium of claim 18 wherein said computer-readable program code embodied therein causes a video processor to perform the step of:

controlling said amount of said overlay data.

24. The computer-usable medium of claim 18 wherein said computer-readable program code embodied therein causes a video processor to perform the steps of:

c) sending said OSD data to said display device;

d) interrupting said sending of said OSD data; and e) sending overlay data to said display device in lieu of said OSD data.

25. The computer-usable medium of claim 24 wherein said computer-readable program code embodied therein causes a video processor to perform the step of:

sending a signal from an OSD unit to an overlay unit, said signal for interrupting said sending of said OSD data.

26. The computer-usable medium of claim 24 wherein said computer-readable program code embodied therein causes a video processor to perform the step of:

interrupting said sending of said OSD data in response to information within said overlay data.

* * * * *